United States Patent [19]

Bonci

[11] Patent Number: 4,748,586
[45] Date of Patent: May 31, 1988

[54] DATA PROCESSING SYSTEM WITH INTERRUPT FACILITIES

[75] Inventor: Franco Bonci, Ivrea, Italy

[73] Assignee: Ing. C. Olivetti & C., S.p.A., Ivrea, Italy

[21] Appl. No.: 93,139

[22] Filed: Sep. 2, 1987

Related U.S. Application Data

[60] Continuation of Ser. No. 870,433, Jun. 4, 1986, abandoned, which is a division of Ser. No. 437,322, Oct. 28, 1982, Pat. No. 4,615,019.

[30] Foreign Application Priority Data

Nov. 13, 1981 [IT] Italy .................. 68475 A/81

[51] Int. Cl.⁴ .............................................. G06F 9/00
[52] U.S. Cl. .................................................. 364/900
[58] Field of Search .................. 364/200, 900, 300

[56] References Cited

U.S. PATENT DOCUMENTS

| | | | |
|---|---|---|---|
| 4,001,784 | 1/1977 | Barnotti | 364/200 |
| 4,025,904 | 5/1977 | Adney et al. | 364/200 |
| 4,067,058 | 1/1978 | Brandstaetter et al. | 364/200 |
| 4,159,516 | 6/1979 | Henrion et al. | 364/200 |
| 4,200,912 | 4/1980 | Harrington et al. | 364/200 |
| 4,250,546 | 2/1981 | Boney et al. | 364/200 |
| 4,275,458 | 6/1981 | Khera | 364/900 |
| 4,332,011 | 5/1982 | Estein et al. | 364/200 |
| 4,365,294 | 12/1982 | Stokken | 364/200 |
| 4,400,694 | 8/1983 | Wong et al. | 364/200 |
| 4,414,624 | 11/1983 | Summer, Jr. et al. | 364/200 |
| 4,435,780 | 3/1984 | Herrington et al. | 364/200 |

Primary Examiner—Thomas M. Heckler
Assistant Examiner—John G. Mills
Attorney, Agent, or Firm—Banner, Birch, McKie & Beckett

[57] ABSTRACT

The system comprises a series of input-output units (I/O) connected by means of a bus (21) to a central unit (CPU) capable of accepting at least one category of vectored interrupts requested by the I/O units and a category of non-vectored interrupts.

The vectored interrupts are divided into at least two levels in which relative priority between units belonging to the same level depends on the position of the respective connection to a conductor of the bus.

Performance of an interrupt is carried out by means of a routine which includes a closing tail. The performance of a series of interrupts of the same level may be carried out serially by suppressing the tail of all the routines except the last.

The non-vectored interrupts are divided into a plurality of levels which are defined by the content of a register which is capable of being variably loaded by means of a suitable instruction. The content of the register in turn addresses a specific routine for performance of the interrupt.

The I/O unit may also be connected for direct access to a common memory (RAM) with a priority defined by the position of the respective connection to another conductor of the bus.

2 Claims, 7 Drawing Sheets

| | RAM | | |
|---|---|---|---|
| | EP T4 | EP T3 | EP..... |
| T1=ZRM | AV1 L1 | | |
| | AV1 L2 | | |
| | ADDR | | |
| | PSI TRAP | | |
| | PSI NMI | | |
| T2=PSA | PSI VI | | |
| | PSI NVT | | |
| | EP V0 | | |
| | EP V1 | | |
| | EP V2 | | |
| | - - - - - - - - - | | |
| T3= V→DDB | V0 → DDB<br>V1 → DDB<br>V2 → DDB<br>- - - - - - | | |
| T4= NL→DDB | NL(A) → DDB(A)<br>NL(B) → DDB(B)<br>- - - - - - | | |
| T5=DDB | DDB(A) →<br>DDB(B) →<br>- - - - - | EP-L1  EP-L2<br>EP-L1  EP-L2 | TF  TE  TS<br>TF  TE  TS |

# DATA PROCESSING SYSTEM WITH INTERRUPT FACILITIES

BACKGROUND OF THE INVENTION

This application is a continuation of application Ser. No. 870,433 (now abandoned), filed June 4, 1986, which is a division of application Ser. No. 437,322, filed Oct. 28, 1982, now U.S. Pat. No. 4,615,019.

The present invention relates to a data processing system having an apparatus for controlling interruptions in the program, wherein a series of input-output units I/O is connected by way of a system bus to a central unit which is capable of accepting at least one category of vectored interrupts requested by the I/O units and a category of non-vectored interrupts generated by the operating system of the program in consequence of predetermined operations.

In a data processing system of the above-indicated type, vectored interrupts are capable of masking non-vectored interrupts which therefore are of lower priority than the vectored interrupts. However, such a system is unable to resolve the conflicts which derive from simultaneous requests for a plurality of interrupts of the same category.

Other systems are known in which each I/O unit is assigned a predetermined priority which is defined by a particular code despatched to the central unit. When there is a large number of interrupting units, such codes require a relatively high level of circuitry resources which complicate operation of the central unit.

SUMMARY OF THE INVENTION

The object of the present invention is to provide an apparatus for controlling interrupts, which is very simple and reliable in operation.

The system according to the invention is characterised by means capable of subdividing at least one of said categories of interrupts into a plurality of priority levels, said means being conditioned by an interrupt of a predetermined level to mask interrupts of a lower-priority level.

BRIEF DESCRIPTION OF THE DRAWINGS

These and other features of the invention will be more clearly apparent from the following description of a preferred embodiment given by way of non-limiting example, with reference to the accompanying drawings in which.

DESCRIPTION OF THE PREFERRED EMBODIMENT

Figure 1:
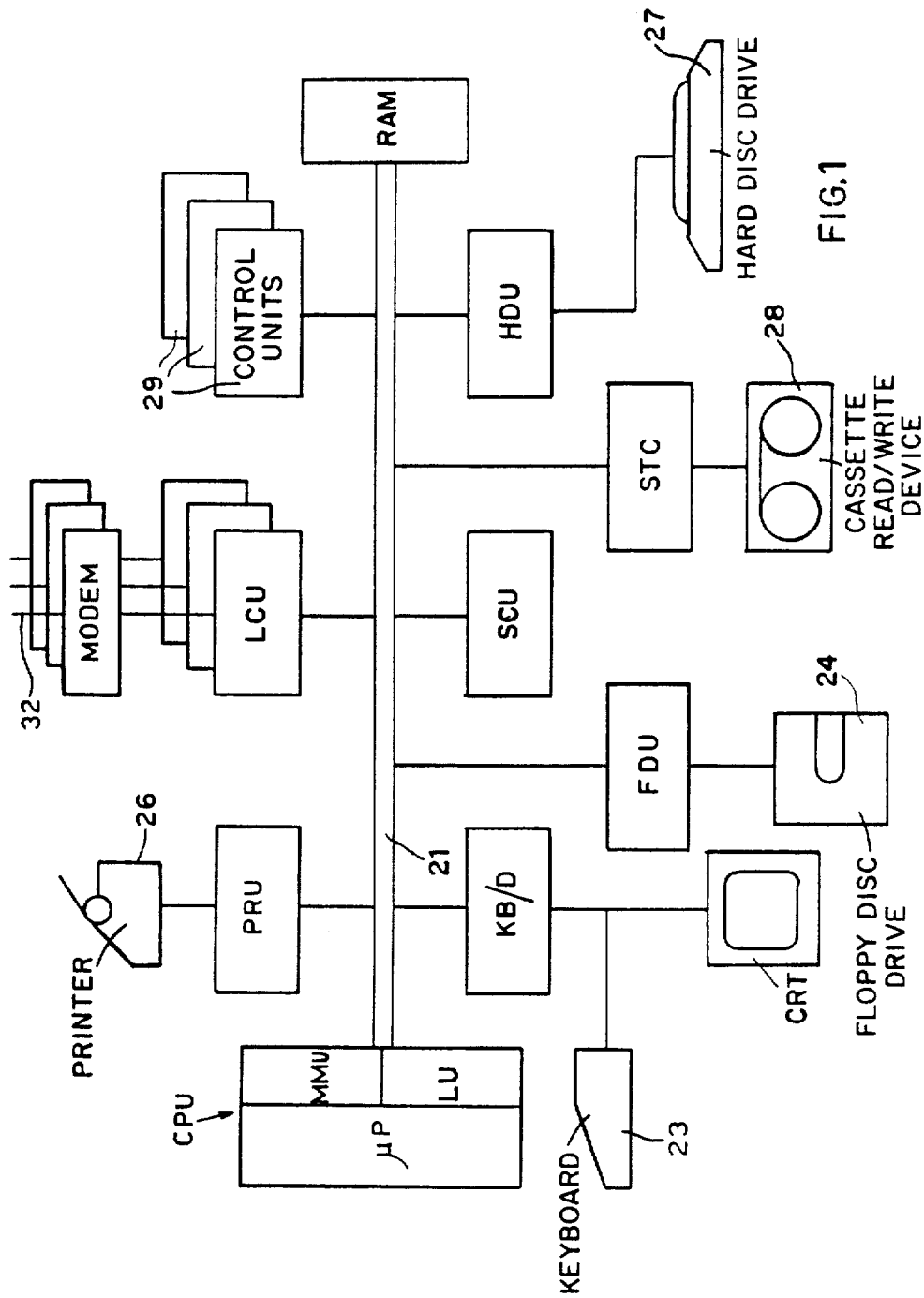
FIG. 1 is a general view of the data processing system incorporating the invention.

The data processing system has a mono-processor structure, in which a central processing unit CPU (FIG. 1) provides for internal computing and control of a series of operating stations and peripheral devices by way of a single bus 21 of master/slave type, with which the various units are interfaced. In particular, the bus 21 may comprise up to fourteen interfaces, to each of which the CPU is serially connected, the CPU always performing the function of master, that is to say, having the capacity to acquire control of the bus for handling transfer operations. Connected to other interfaces of the bus 21 is a RAM memory, for example an 8M byte memory, and a series of input-output (I/O) units, each of which always perform as a slave, that is to say, recognising a transfer intended therefor and accomplishing that transfer. The units will always include a control unit KB/D for an alphanumeric keyboard 23 and a video CRT, for example a 15" CRT for around 2000 characters, a control unit FDU for a floppy magnetic disc drive, 24 and a control unit PRU for a serial printer 26. The bus 21 may also have connected thereto a control unit HDU for a high-capacity hard magnetic disc drive 27 and a control unit STC for a device 28 for reading and writing a magnetic tape cassette. Other control units may also be connected to the bus 21, as generally indicated at 29, for optional devices such as badge reading and/or recording devices, numeric keyboards for use by the customer, known as PIN-pad, means for reading and/or marking documents with magnetic characters, banknote dispenser means, and the like.

For systems which require other operating stations disposed within a predetermined distance from the CPU, the bus 21 may also have connected thereto other slave control units SCU for operating stations with a keyboard, video means and printer. On the other hand, for systems which require operating stations at a greater distance, it is possible to connect in, by means of the linear control units LCU and respective modems, one or more communication lines 32 to which the satellite operating stations are connected.

The central unit essentially comprises a 16 bit microprocessor $\mu P$, a unit MMU for controlling the RAM and a specific logic unit LU. The microprocessor and the unit MMU are known per se and are not part of the present invention. The specific logic unit LU will be described in greater detail hereinafter.

In particular, the microprocessor and the MMU comprise two integrated circuits marketed by the company Zilog, which will only be described briefly herein, while reference may be made to the description published by the above-mentioned company for further details of the circuits.

The microprocessor comprises a control unit 33 (FIG. 2) which receives the instructions supplied by an instruction register 34 and decoded by an instruction decoder 35. That in turn is connected to an arithmetic and logic unit ALU 36 and a group of 16 bit working registers RP . . . R15 which in turn are connected to the ALU 36. The group of registers R0 . . . R15 may generally perform the functions of accumulators, index registers routine or program address stacks and memory pointers. The registers R0 . . . R15 however may be organised for selectively processing 8 bit bytes, 16 bit words, double 32 bit words and quadruple 64 bit words.

The microprocessor also includes a 16 bit interface register 40 for data and addresses. The control unit 33 despatches the various orders to the exterior by way of a series of connections 38 which include four connections ST0-ST3 for controlling the state of the microprocessor; two connections BRQ and BAK for controlling the bus 21 and other connections for timing signals, power supply, etc.

Another group of connections generally indicated by reference numeral 39 is provided for the transfer of data and address of the register 40 and segment addresses SN0-SN7 which will be referred to hereinafter.

The MMU (FIG. 1) controls the RAM, essentially performing two functions: the conversion of a logic memory address into a physical address and protection of the memory sector in accordance with attribute or qualification. For that purpose, the RAM may be subdivided into a number of regions or segments up to 128 and each segment may have a length of a number of blocks of 256 bytes, variable from 1 to 256, whereby the length of the segment may be up to 64K bytes. Each byte of the RAM is addressed with a logic address formed by the original number of the segment and the ordinal number of the byte in that segment, which will be referred to hereinafter as the offset. The number of the segment is indicated by seven bits, while the offset requires sixteen bits, of which eight of higher significance represent the blocks. Each memory segment may be attributed with a given limit for the field and for a given function, for example for preventing writing (Read-Only), or preventing access to the microprocessor or reserving it for the operative system, etc. To control the RAM, the MMU comprises a group of registers 41 describing the memory segments. Each register is formed by two words and upon initialisation is set up with the physical address of the respective segment and the relevant limit and function attributes or qualifications. The registers 41 are addressed by the 7 bits of the number of the segment, from the channel SN0-SN6 of the group 39. Those bits provide at the output of the registers 41, the physical address of the origin of the segment. That output is added in an adder 42 with the eight more significant bits of the offset, from another channel A/D8-A/D15 of the group 39. The physical address of the RAM is provided by the output of a third channel A/D0-A/D7 of the group 39 and the sixteen bits A8-A23 outputted by the adding means 42.

The MMU further includes a logic circuit 43 capable of controlling each request for access to an address in the memory, with the qualifications or attributes for the respective memory segment, provided by the registers 41, and responds to any violations by creating an internal interrupt procedure referred to hereinafter as a trap. Finally, the circuit 43 provides for recording violations in such a way as then to permit the microprocessor to eliminate the violations by means of a suitable routine.

Besides the above-mentioned trap, the microprocessor is capable of producing other traps or interrupts which are created synchronously in executing particular instructions, which cannot be masked.

The microprocessor is also capable of processing three different types of interrupts which are generated asynchronously and the requests in respect of which are applied to three corresponding inputs of the microprocessor.

Those interruptions, in order of decreasing priority, are subdivided into:

1. non-maskable interrupts generated by asynchronous external events such as a current failure, parity errors, or the time for an operation which is already due, which are applied to the input NMI;

2. vectored interrupts requested by a specific control means the address of which forms the vector, which are applied to the input VI; and 3. non-vectored interrupts which are requested in the execution of specific program routines, which are applied to the address NVI.

The bus 21 comprises various groups of conductors capable of transferring the corresponding signals between the various units of the system. In particular the bus 21 (FIG. 3) comprises the channel A8-A23 which connects the output of the adding means 42 to the RAM and serves to transfer the physical memory address to the RAM.

Another group is formed by the conductors D8-D15 which are connected to the conductors of the channel A/D-A/D15, and the conductors A/D0-A/D7 which are intended for the transfer of addresses in a certain phase of the machine cycle and data in another phase of the machine cycle. In particular, in a certain phase of the machine cycle, the conductors A/D0-A/D7 may indicate the address of one of the control means of the peripheral units KB/D, PRU, FDU, SCU, LCU, HDU, STC and 29 (FIG. 1) connected to the bus 21. The bus 21 further includes a group 45 of conductors for signals controlling the cycles of data transfer. Those signals comprise a signal MEM (FIG. 3) which is generated in the operating cycles concerning the memory, an address strobe signal AS generated in each machine cycle; a signal DTE operative for enabling and timing the data transfer operation, a signal WRITE for indicating the direction of the transfer operation (if it is 1 it controls reading and if it is 0 it controls writing), a signal WORD to indicate if the data to be transferred is a byte (WORD=1) or a word (WORD=0). The above-mentioned signals are normally generated by the microprocessor which performs the function of master for the bus. Another signal ACK is generated by the control means of the peripheral unit in reply to the DTE when the data of the control means are available for reading or have been used thereby in a writing mode.

Figure 3:
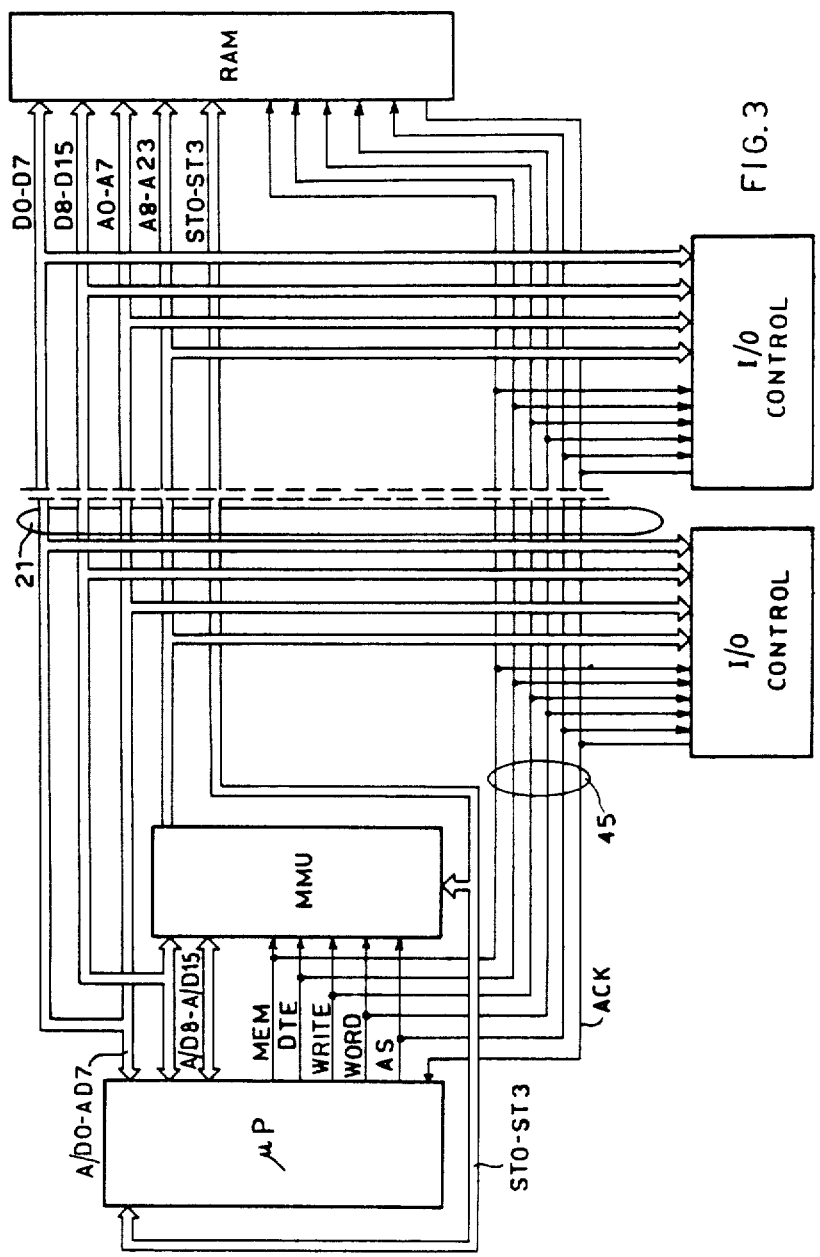
FIG. 3 is a view of the system bus.

The signals of another group of conductors ST0-ST3 of the bus 21 are generated by the microprocessor and are adapted to qualify the state of the microprocessor and thus the type of transfer operation being performed. The various control units of the peripheral I/O devices, of which only two are shown in FIG. 3, are all interfaced with the bus 21. Access of the microprocessor to the various input-output peripheral units is effected by means of the bus 21 with an instruction formed by a sixteen bit word. The formation of the instruction is:

wherein NP is the name of the board on which the control means is mounted and GOP is the name of the unit on the board, while SF is the function to be performed at the unit addressed, and may vary according to the control means.

The name of the control means therefore corresponds to its physical position on the board.

According to the invention, the control means of the various peripheral units may be enabled to request two different levels of vectored interrupts which are as follows, in decreasing order of priority:

Interrupts of level L1 for operations which require an execution time of up to 80 us; they are used by the control means which operate in input/output mode (I/O), programmed with character level interrupts;

Interrupts of level L2, with a priority below that of the above interrupts for operations which require an execution time of less than 2 ms; they are used as operation and interruptions by the control means after having carried out a data transfer operation in a direct access mode to the RAM (DMA), or a mechanical operation, or due to a maximum time provided for particular functions expiring.

In particular, interrupts at level L1 are divided into two classes and sub-levels, of decreasing order of priority:

L1A for interrupts at level L1 required with a frequency of higher than 600/sec. and L1B for interrupts at level L1, required at a frequency of less than 600/sec.

Obviously, a predetermined control means may be enabled to emit vectored interrupts at two or more levels or classes, depending on the function which causes the interruption. Hereinafter, the control means are indicated by CONT followed by an order number, independently of the unit controlled thereby, with the exception of the control means of the printer 26 which is indicated by CONTP.

Figure 4:
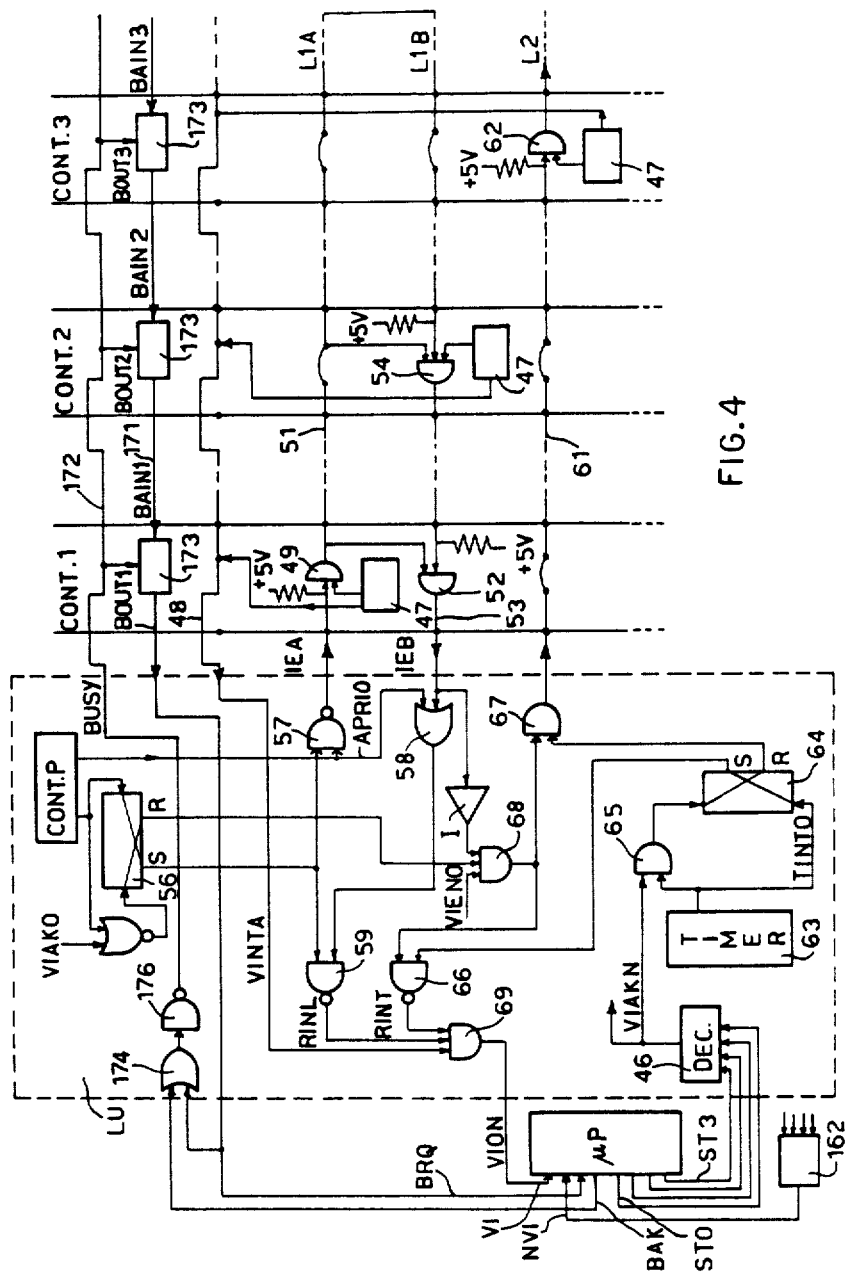
FIG. 4 is a diagrammatic view of the connection of the control means of the various I/O units to the central unit.

The logic unit LU (see FIG. 4) which is part of the CPU is provided for connecting the various control means to the bus 21. The logic unit LU is connected to the microprocessor by a line capable of transmitting to the input VI of the microprocessor a vectored interrupt request signal VION. The logic unit LU comprises a decoder 46 for decoding the state signals ST0–ST3 in respect of the state of the microprocessor, and emitting a signal VIAKN indicating acceptance (acknowledge) on the part of the microprocessor, of an interrupt request. Also connected to the logic unit LU is a group of four lines which serve for connecting the various control means to the bus 21, in daisy chain fashion. In this form of connection, the priority of the various control means belonging to the same level and to the same class depends on the relative position of the connection of the various control means to the bus 21 whereby the ordinal number of the control means is indicated as increasing from the logic unit LU. Each control means CONT1 . . . CONT3 comprises an interrupt control circuit 47 connected to a first common line 48 of the group, by way of which the circuit 47 despatches a vectored interrupt request signal VINTA. In addition, the circuit 47 of the control means of class L1A (in FIG. 4, CONT1) is connected by way of an AND gate 49 to a second line of the group.

The output of the AND gate 49 is also connected by way of a second AND gate 52 to a third line 53 of the group. The circuit 47 of the control means of level L1B (in FIG. 4, CONT2) is however connected to the line 53 by way of an AND gate 54, to which the line 51 is also directly connected. The ends of the line 51 and 53 opposite to the logic units LU are connected together whereby the two classes L1A and L1B form a single daisy chain.

The printer control means CONTP is connected to the daisy chain of level L1 by way of a flip-flop 56 which is set to low level when CONTP requests an interrupt and is successively reset when the interrupt terminates, by means of a signal VIAKO, which is the negative of the acceptance signal VIAKN. The set outputs of the flip-flop 56, is connected to the line 51 by way of a NAND gate 57 for receiving a signal APRIO emitted by CONTP together with the interrupt request. The signal APRIO is also applied to an OR gate 58, the output of which is connected to another NAND gate 59. The other input of the NAND gate 59 is connected to the set outputs of the flip-flop 56. The signal APRIO is produced by a flip-flop and may be selectively '0' or '1', permanently or under control by the microprocessor. If CONTP is to be connected to the lower level of the daisy chain, that is to say the class L1B, the signal APRIO is 0: if CONTP is to be connected to the higher level of the daisy chain, that is to say, the class L1A, the signal APRIO is 1.

The circuits 47 of the control means which are enabled to request interrupts at level L2 (in FIG. 4 CONT3) are connected to a fourth line 61 of the group by way of an AND gate 62. Also connected to level L2 is a timer 63 which may be preset to emit a signal TINTO when one or more predetermined times expire. The signal TINTO is capable of setting a flip-flop 64, the set outputs of which is connected to a NAND gate 66. The flip-flop 64 is reset upon receiving the following signal VIAKN produced by the decoder 46, by way of an AND gate 65. The reset output R of the flip-flop 64 is connected by way of an AND gate 67 to the line 61. The AND gate 67 is also connected to the output of an AND gate 68 whose inputs are connected to the reset output R of the flip-flop 56, the line 53 and a line VIENO. The line VIENO carries a signal from the microprocessor which, when it is high, disables the chain at level L2, which can then be interrupted, whereby it represents a mask for the interrupts of level L2. Finally, the logic unit LU comprises an AND gate 69 capable of despatching the signal VION to the input VI of the microprocessor. The inputs of the AND gate 69 are respectively connected to the line 48, the NAND gate 59 and the NAND gate 66. Each unit CONT1 . . . CONT3 is finally connected to the output of the decoder 46, for receiving the interrupt acceptance signal VIAKN. Normally, the signal VINTA is at low level. It is shifted to high level when one of the units CONT1 . . . CONT3, by means of the related circuit 47, requests an interrupt.

It will first be assumed that the circuit 47 of the unit CONT1 requests the interrupt. That enables the related AND gate 49, the output of which enables the AND gate 52 which moves the output signal IEB of the line 53 to high level. If the signal APRIO is at 1 (CONTP connected with lower priority in class L1B), the signal IEB sets the output of the OR gate 58 to low level, whereby the output RINL of the gate 59 is at high level. Similarly, the output RINT of the NAND gate 66 is at high level, whereby the gate 69 transmits the signal VION to the microprocessor. The interrupt is then executed when the microprocessor, by way of the decoder 46, emits the signal VIAKN.

It will be clearly seen that, by virtue of activitation of the two AND gates 49 and 52 of the control unit of class L1A which requested the interrupt, all the requests of any control units of class L1A at downstream positions (to the right in FIG. 4) of that which requested the interrupts and those of the control units of class L1B are ignored. The output signal of the AND gate 49 therefore forms a mask for interrupts of class L1B.

It is now assumed that the interrupt is requested by the circuit 47 of the unit CONT2. That then enables the related gate 54 and sets the line 53 to the unit LU at high level, whereby in class L1B it is the more downstream control unit which has maximum priority.

If the interrupt is requested by CONT P and the signal APRIO is 1, whenever there is no current request for an interrupt in class L1A and L1B, the signal is low, whereby the output of the OR gate 58 is high. Since the flip-flop 56 has been set, the NAND gate 59 again produces a signal RINL, thereby effecting interruption by CONT P with the lowest priority in class L1B. If, however, the signal APRIO is 0, the output of the gate 58 is high and the setting output of the flip-flop 56 applies the signal RINL to the gate 59, whereby interruption by CONT P is effect with highest priority in class L1A.

In any case, any interrupt of level L2, in the presence of an interrupt of level L1, is ignored until the output of the AND gate 68 is at high level. In the absence of an interrupt at level L1, that output is at low level. If then a control unit of level L2 (in FIG. 4, the CONT 3) requests an interrupt, the circuit 47 thereof generates the signal VINTA while, by wayof the AND gate 62, it excludes any other downstream requests (to the right of FIG. 4), which are thus ignored. If the timer 63 sets the flip-flop 64 during an interrupt at level L2, the set output of the flip-flop 64 puts the output of the NAND gate 66 to high level, whereby the microprocessor receives the request from the timer 63 with the highest priority at level L2. The reset output of the flip-flop 64, by way of the AND gate 67 however enables the interrupt request at level L2.

It will be appreciated that both the unit CONT P and the timer 63 are able to set the signal VINTA on line 48 to high level, like the other units CONT 1 ... CONT 3.

Setting Up the Memory For Operation of the System

Operation of the above-described system requires the definition of a series of parameters and tables, which is automatically effected at each access in a sector of the RAM, with a series of routines of an initialisation program. The system operating in that phase will be referred to hereinafter as the virtual machine.

In that operation, a first region of the RAM is set up with a Table T1 (see FIG. 6) which will constitute the reserved region ZRM of the memory. That defines the following parameters:

A series of entry point addresses EP for example for the successive tables T3 and T4, which being descriptive of the system, may be of variable lengths, an area AV1 for saving the registers of the microprocessor during the interrupts V1 of level L1, an area AV2 for saving the registers of the microprocessor during interrupts VI of level L2, and an area ADDR for the deposit of data for interrupt routines.

A second region of the RAM is set up with a table T2, referred to as the program state area PSA, which contains all the program state information (PSI), i.e. the flag control word (FCW) and the program counter (PC) which, following an interrupt, permit the respective execution routine to be identified and initiated.

Figures 5, 6:
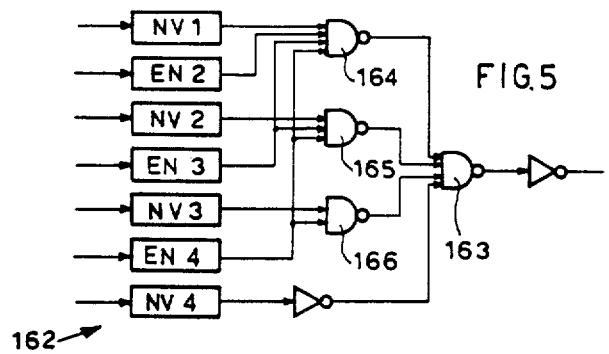
FIG. 5 is a logic diagram in respect of control of non-vectored interrupts.
FIG. 6 is a diagram in respect of initialisation of the memory of the system.

Therefore, since the control byte in the register 34 (FIG. 2) can request at least one trap and the interrupts NMI, VI and NVI, there will be four PSI (see FIG. 6). In addition, for each control unit, and thus for each vector, the Table T2 records the entry point (EP) of the routine associated with the corresponding vector. Therefore, in the case of NVI, NMI and TR, the microprocessor accesses to the PSA, adding to the fixed EP of the PSA, an offset established by the type of interrupt where the value of FCW and PC of the related routines is found.

Figure 2:
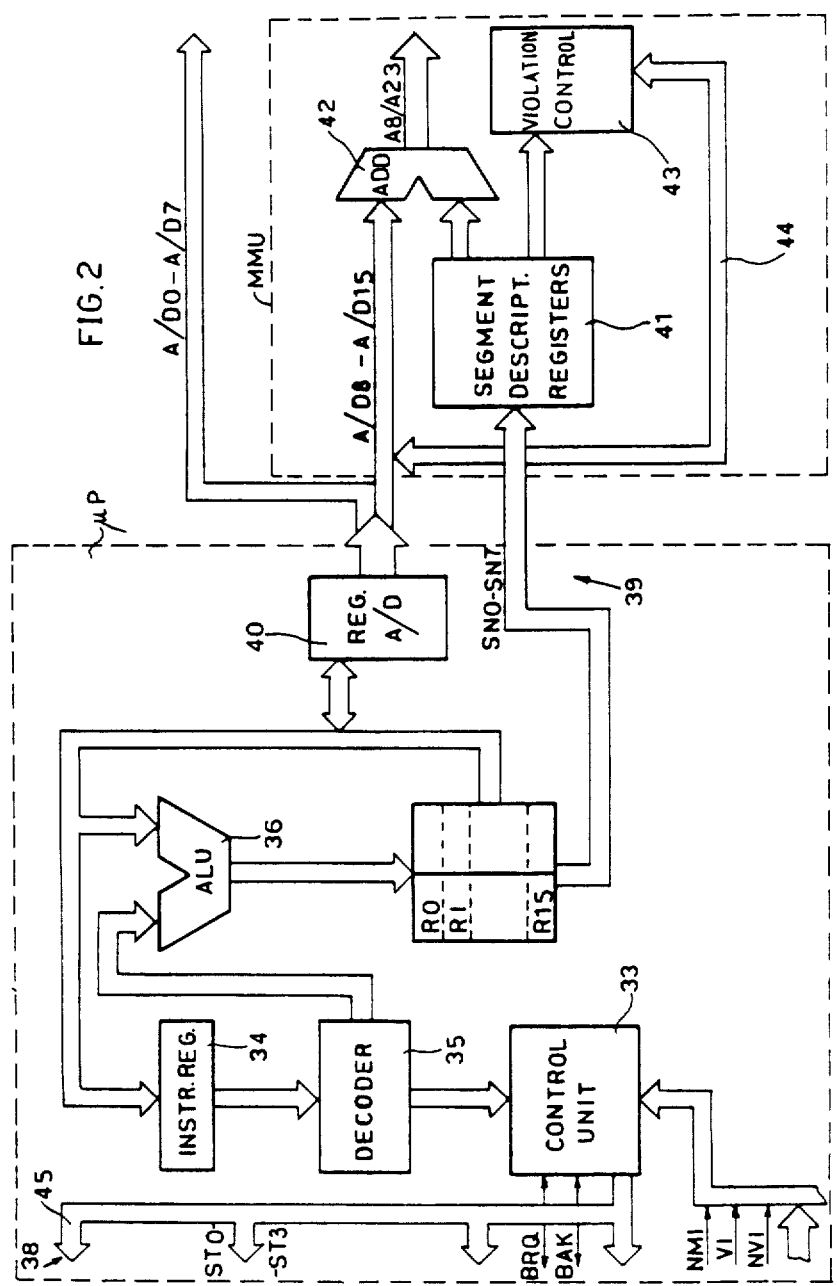
FIG. 2 is a logic diagram of the central unit of the system shown in FIG. 1.

In the case of vectored interrupts VI, after reading the PSI which is common to the VI, the value of the address of the EP of the related vector is also added. In both those cases, the vector is then loaded into one of the registers R0 ... R15 of the microporcessor (FIG. 2).

A third table T3 of the RAM (see FIG. 6) is loaded with a block containing the description of each device (DDB). That table starts from the EPT3 indicated by ZRM and contains, for each vector, the EP of the specific DDB of the interrupting device. Therefore, when two equal devices have two different vectors, beside, the two vectors there will be the same DDB. The table T3 is not of a fixed size, but its size depends on the number of devices connected to the system.

Another table T4 is loaded with a list which relates the logic name of each device to the associated DDB. The logic name is formed by a word comprising a byte for indicating the type of control unit, 4 bits for indicating the specific control unit of the same type, and 4 bits for indicating the specific device within the control unit. Besides the logic name, also recorded in Table T4 is the offset in respect of the respective DDB, from the EP of the table T3. For access of the microprocessor to the table T4, while the EP Of the table T4 is derived from the table T1, the logic name NL is found by scanning from the EP. The size of this table also depends on the number of devices connected to the system.

A final table T5 is loaded into a corresponding region of the memory, with the I/O descriptions of the devices present in the system (DDB). For each DDB, there is recorded a block of variable length, which comprises the Ep of the routine to be activated following an interrupt of class L1A or class L1B, the EP of the routine to be activated for an interrupt L2, other information TF, TE, TS relating to the device described, such as the specific routine which controls the orders initiated by the operating program for the control unit or device, and the like.

The above-mentioned tables T1-T5 are prepared by the microprocessor from a firmware initialisation program which is temporarily entered in the RAM and which causes the microprocessor to explore all the connections of the various control units connected to the bus 21. At the end of this operation, that prgram is cancelled from the RAM and replaced by other software (SW) modules, in particular the module of the operating system, thereby eliminating the virtual machine. It will be clearly seen that the various tables T1-T5 are arranged hierarchically in such a way as to find the specific routine for each interrupt by means of references from one table to the next.

Execution of Vectored Interrupts

The execution of the interrupts in the initialised system, as referred to above, will now be described.

Figure 7:
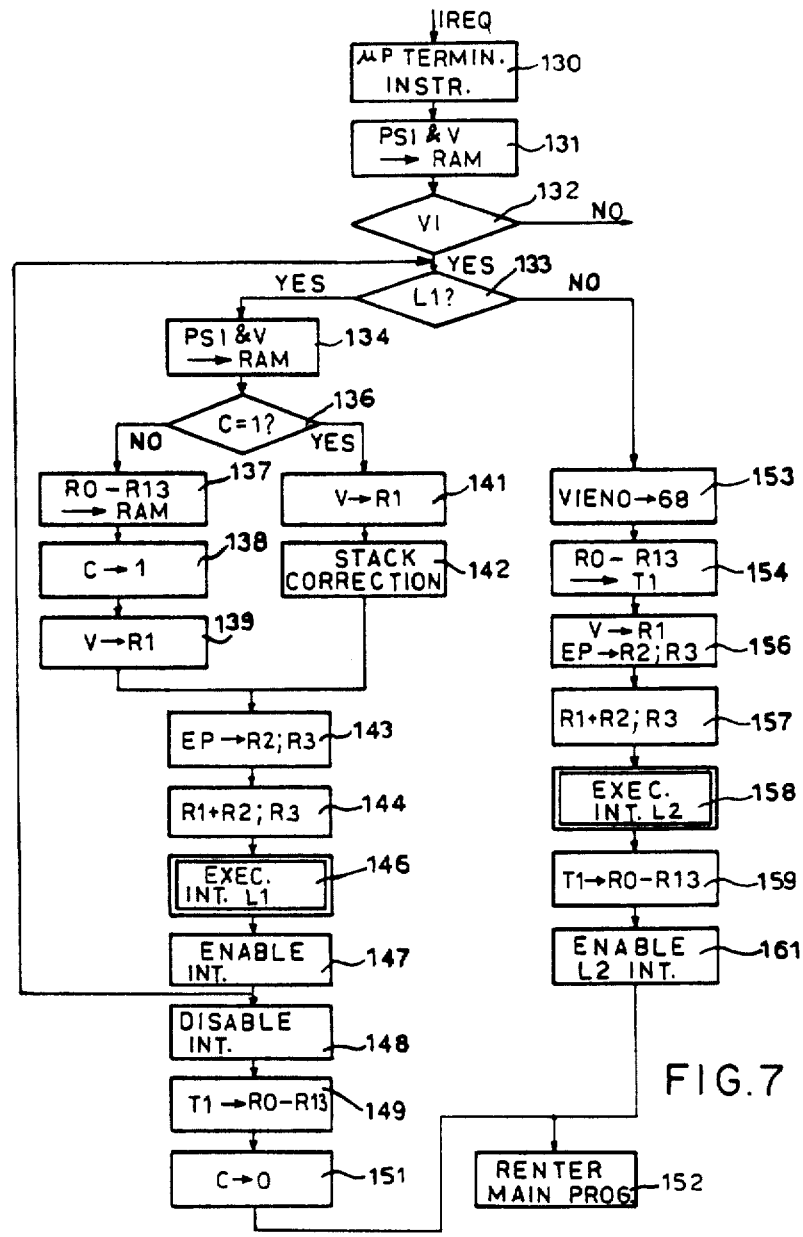
FIG. 7 is a flow chart in respect of performing vectored interrupts.

When the microprocessor receives an interrupt request IREQ, before accepting it, it terminates execution of the current instruction (block 130 in FIG. 7). Then, it transfers the PSI of the current program, and then the related FCW and PC, as well as the vector, in the case of a vectored interrupt routine, from the stack register R14 (FIG. 1) to a stack region of the RAM (block 131 in FIG. 7). Then, the microprocessor identifies the type of interrupt or trap, with a series of decisions 132 and 133, and accesses the related table T2 of the PSA to take out the new PSI, thus initiating a new program which is the interrupt service routine. If the interrupt is an interrupt of level L1, the FCW of the PSI is loaded into the register R14 of the microprocessor (block 134) with the highest bit, referred to as carry, C=0, if a program has been interrupted; however, it is loaded with C=1, if a program has not been interrupted.

By means of a decision 136, the microprocessor now examines the carry. If C=0, it performs a save operation in respect of the registers R0-R13 of the microprocessor in the deposit area of the region T1 of the RAM (block 137) whereupon it sets C=1 in the register R14 (block 138). The microprocessor then loads into the register R1 the vector registered in the stack of the RAM waiting to be served (block 139). However, when the carry C is already at 1, it is not necessary to save the present state of the registers R0-R13 since the body of the preceding routine has been completely executed. Consequently, the vector of the stack is immediately loaded into the register R1 (block 141). In addition, the stack is incremented by 8 bytes to cancel the PSI of the routine which is by now executed, so as to cause the PSI of the main program to reappear from the stack (block 142).

In both cases, the EP of the specific DDB recorded in the table T3 (see FIG. 6) is now loaded into the double register R2 R3 (block 143 in FIG. 7). R1 and R2 R3 are now added in the ALU (see FIG. 2) to obtain in R2 R3 the physical address of the EP of the DDB concerned (block 144). The specific part of the interrupt routine is then executed (block 146).

After this, the microprocessor executes an interruption enabling instruction (block 147) which creates a window which permits identification of any other pending interrupts at level L1. In such a case, the positive result of the decision leads to the decision 136, whereafter the respective routine is executed, after which a fresh window is opened. If, after execution of the enabling instruction (block 147), there is not another pending interruption at level L1, an interrupt disabling instruction is executed (block 148) which closes the window of the routine. An operation 149 is now carried out, in which the state of the registers R0-R13 is restored. The carry is again set to 0 (block 151) and the main program is re-entered (block 152) after execution of the main program re-entry code and restoration of the state of the registers and the PSI of the main program.

It will be clearly seen therefore that each routine for execution of interruptions at level L1 comprises a head (operations 130-136), a body (operations 143-147) and a tail (148-152). Whenever there is a series of such interrupts awaiting execution, it is possible to introduce any number of interrupts VI at level 1 in the window at the end of the body of the routine. The state of the registers of the main program must be saved only by the first routine. Successive routines will provide only for correcting the stack, in such a way as to keep the PSI of the main program visible. Only the routine of the last interruption will execute the tail for restoring the conditions of the main program. Since, as already stated above, the execution of interrupts VI at level 1 will not exceed 80 us, while the time for execution of an entire routine at level L1, because of the head and the tail, requires about 10 us more, it will be apparent that the saving in time in regard to L1 interrupts adds up. An interrupt at level L2 is executed in a similar manner to an interrupt at level L1, but without the above-mentioned time saving effect. When the microprocessor identifies the interrupt L2, it blocks the line 61 (FIG. 4) of the level L2 with the signal VIENO, which however permits any interrupts at priority level L1 (block 153). The microprocessor now saves the registers R0-R13 of the main program in another portion of the region T1 of the RAM (block 154). It then loads the vectors in R1 and the EP of the table T3 in R2 R3 (block 156). It then addes R1 to R2-R3 in order to obtain in R2-R3 the EP of the DDB concerned (block 156), and executes the specific body of the routine (block 158). Then, the microprocessor restores the state of the registers R0-R13 of T1 (block 159) and again enables an interrupt at level L2 (block 161). If there are no other interruptions at that level, execution of the main program is resumed (block 152). If, during execution of a routine at level L2, there is an interrupt at level L1, the latter views the level L2 routine as a main program, whereby it is interrupted as first shown.

Non-Vectored Interruptions

Both the interrupts at level L1 and the interrupts at level L2 may be separated into two categories:

Interrupts the processing of which will exclusively concern firmware (FM) routines, and concern standard activities due to the HW structure, which examines service thereof, without affecting operating system modules;

Interrupts the processing of which requires software (SW) modules which are necessary since there is no standard treatment defined for this occurrence.

Such occurrences require an interruption procedure, but they do not fall into the category of vectored interrupts as referred to above, and may be processed by means of special routines independently of the vector which created them. Such interrupts are referred to as non-vectored interrupts (NVI) and are of lower priority than vectored interrupts.

According to the invention, non-vectored interrupts are divided into four different levels, with decreasing priorities. A first level NV1 is reserved for services of slow units which require an execution time of more than 80 us, and services required by the peripheral units at a low frequency, such as keyboard transfer operations. A level NV2 reserved for services of connection as between I/O units and the system software, such as possible complementing and finalisation of an operation or predisposition of a procedure awaiting utilisation. Interrupts NV1 and NV2 are thus originated and engaged by vectored interrupts. Two levels NV3 and NV4 are available to the system software. Mention may be made for example of analysis of a character already accepted by the memory or the exchange of characters with a communication line, on the basis of a specific protocol, by way of a LCU unit (see FIG. 1) and the related modem.

For the purpose of dealing with non-vectored interrupts the arrangement has a logic circuit 162 (see FIG. 4), comprising a group of four flip-flops each associated with a level of NVI and indicated in FIG. 5 by the same designation, that is to say, NV1-NV4. The signals from the flip-flops are applied to the microprocessor by way of a NOR gate 163. Another group of three flip-flops EN2-EN4 is arranged to enable the interrupt request of the corresponding flip-flops NV2-NV4 by way of three corresponding NOR gates 164, 165 and 166. The signals which set the flip:flops EN2-EN4 form the masks of the NVI. In addition, each flip-flop NV1-NV4 is associated with a corresponding queue of events, which are memorized in corresponding registers as the various causes of interrupts as the respective levels emerge.

In particular, the level NV1 is followed in the queue by interrupts V1 at level L1 for programmed I/O of slow peripheral devices. The level NV2 is followed by interrupts VI at level L1 and L2 for completion of an operation. Level NV1, for operations in respect of transfers of characters between memory and periphery, also follows the event at level NV2. Servicing of an interrupt NV1 is executed with the enabled vectored interrupts VI at level L1 and L2, whereby it may be interrupted by the interrupt VI. Servicing of interrupt NV2 is executed with the interrupts VI and the interrupts NVI which are enabled, and so forth.

Therefore, the entire system of interrupts occurs as a series of levels, each of which is masked by the levels of higher priority and masks the levels of lower priority, in accordance with the following table:

|  | MASK | | | | | |
| --- | --- | --- | --- | --- | --- | --- |
|  | L1 | L2 | NV1 | NV2 | NV3 | NV4 |
| NMI | X | X | X | X | X | X |
| L1 | X | X | X | X | X | X |
| L2 |  | X | X | X | X | X |
| NV1 |  |  | X | X | X | X |
| NV2 |  |  |  | X | X | X |
| NV3 |  |  |  |  | X | X |
| NV4 |  |  |  |  |  | X |

Therefore, referring to FIG. 1, NV1 always acts, NV2 acts if EN2=1; NV3 acts if EN2=1 and EN3=1 and NV4 acts if EN2-EN4 are 1. It will be appreciated that all the non-vectored interrupts can be masked by the microprocessor operating on the bit NVI of the FCW.

Control of the interrupts is carried out by instructions from the program, the part SF of which can assume, for the various functions, one of the values set out in the following table:

| SF | Function | |
| --- | --- | --- |
| 0 | Reset interruption | NV1 |
| 1 | Reset interruption | NV2 |
| 2 | Reset interruption | NV3 |
| 3 | Reset interruption | NV4 |
| 5 | Reset enabling | EN2 |
| 6 | Reset enabling | EN3 |
| 7 | Reset enabling | EN4 |
| 8 | Set interruption | NV1 |
| 9 | Set interruption | NV2 |
| A | Set interruption | NV3 |
| B | Set interruption | NV4 |
| D | Set enabling | EN2 |
| E | Set enabling | EN3 |
| F | Set enabling | EN4 |

The state of the interruptions and the enabling actions can be read, at uneven addresses, with field GOP=8, which indicates a particular unit. The entry byte is of the following form:

| 7 | 6 | 5 | 4 | 3 | 2 | 1 | 0 |
| --- | --- | --- | --- | --- | --- | --- | --- |
| N | N | N | N |  | E | E | E |

-continued

| 7 | 6 | 5 | 4 | 3 | 2 | 1 | 0 |
| --- | --- | --- | --- | --- | --- | --- | --- |
| V1 | V2 | V3 | V4 | X | N2 | N3 | N4 |

The engagements or bookings in respect of the interrupts NVI are extracted from the respective queues, in accordance with the above-mentioned priorities, and disposed in a register of the microprocessor ready to be examined and serviced. Such extraction operation is effected when all the interrupts are disabled, by means of suitable routines. When the microprocessor receives a request for interruption NVI, it effects saving of the PSI in the register R14, as for the vectored interrupts, and surrenders control to the routine which governs the EP of the NVI. Then, it effects saving of the registers in the stack of the system and identifies the level of the NVI. That is effected with all the NVI of higher priority and all the enabled VI, whereby it can be interrupted by the latter. When then, it resumes and concludes its service, the NVI is reset only if the respective queue is empty. In that case, a routine is performed for a fresh request for a possible interruption of lower priority.

This therefore provides for real-time scheduling of the software activities involved in particular results of the service routines of the various interruptions, independently of the level of origin.

Bus Arbitration in DMA

The units CONT 1 . . . CONT 3 (see FIG. 4) may be enabled for direct access to the RAM (DAM), for example in a situation of multiple character exchanges. For that purpose, the control units are connected to a pair of lines 171 and 172 of the bus 21, in accordance with a further daisy chain having maximum priority, and which extends from Cont 1 to CONT 3, imparting progressively decreasing priority to the master bus.

In particular, each CONT comprises a circuit 173 inserted on the lines 171 and connected to the line 172. The line 171 is connected to the input BRQ of the microprocessor and to an OR gate 174. The output BAK of the microprocessor is connected to the OR gate 174, the output of which is connected by way of a NOR gate 176 to the line 172. A signal BUSY on the line 172 at high level indicates that the bus 21 is occupied.

When a unit CONT asks the microprocessor for control of the bus 21, the circuit 173 sets an output signal BOUT to low level. The microprocessor receives the request at its input BRQ and, synchronously with the clock of the bus, emits an acceptance signal at its output BAK. The unit CONT which produced the request then becomes master of the bus.

Figure 8:
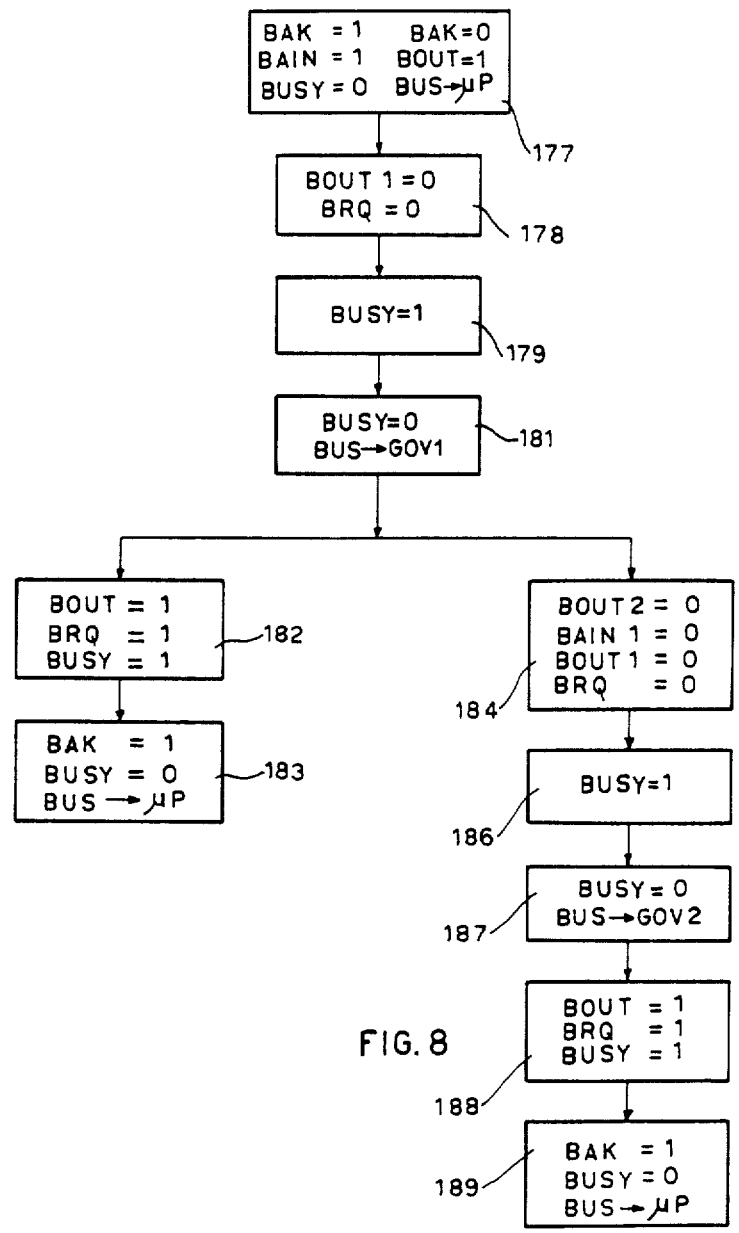
FIG. 8 is a flow chart in respect of acquisition of the bus by the various units.

Arbitration of the bus 21 operates as follows:

It is first assumed that the microprocessor is operating on the bus 21 and that are no requests for access on the part of the units CONT. The signals BAIN and BOUT (see FIG. 4) of all the circuits 171 are at high level, that is to say, at 1, the signal BRQ is at 1, while the signal BUSY is at 0, indicating that the bus 21 is occupied (block 177 in FIG. 8). If CONT 1 requests the bus 21, the respective circuit 173 sets its signal BOUT at 0 and thus also BRQ=0 (block 178), while the related signal BAIN and all the signals BOUT and BAIN of the other control units remain at 1. At the end of the current machine cycle, the microprocessor (FIG. 4), detecting the BRQ=0, sets BAK=0. By way of the OR gate 174 and the NOR gate 176, the signal BUSY goes to 1 and the bus 21 is freed (block 179 in FIG. 8). The circuit 173 (see FIG. 4) of the unit GOV1 now sees BUSY=1 and with the positive edge of the clock again sets BUSY at 0 (block 181 in FIG. 8). Thus, it takes possession of the bus 21 and supplies the bus directly with the signals MEM, WRITE, WORD, DTE, AS (FIG. 3) for data exchange with the RAM.

It is first assumed that there is no other control unit requiring the bus. The unit CONT 1 performs its operation in DMA and at the end, with the positive edge of the next clock, sets BOUT 1=1, whereby BRQ=1 and BUSY=1. The bus 21 is thus released from the unit CONT 1 (block 182). The microprocessor now sees the signal BRQ=1 and, with the positive edge of the clock sets BAK=1 and thus BUSY=0, thus regaining possession of the bus (block 183). If, however, while CONT 1 was operating with the bus 21 and CONT 2, of lower priority, requests the bus, the respective circuit 173 sets its signal BOUT 2=0. It now puts the signals BAIN and BOUT upstream and the signal BRQ equal to 0, but since BUSY is still at 0, the bus 21 still remains in the possession of CONT 1 (block 183). When then CONT 1 terminates its connection in DMA, with the positive edge of the clock, it sets BUSY=1, thus releasing the bus (block 186). CONT 2 now sees the signal BUSY=1 and, with the positive edge of the clock, sets BUSY=0, gaining possession of the bus and in turn becoming master of the bus (block 187).

When CONT 2 concludes its work, if there is a request for the bus 21 (see FIG. 4) from the downstream units CONT, control of the bus goes to the following CONT in the daisy chain which has made a request therefore, and so forth. If however, there is no other request for the bus by the downstream units CONT, with the positive edge of the clock, CONT 2 sets the signal BOUT 2=1. Then, all the signals BAIN and BOUT upstream and the signal BRQ are set to 1, whereby the signal BUSY is set at 1 by way of the OR gate 174 and the NOR gate 176 (block 188 in FIG. 8). Finally, the microprocessor emits on its own account the signal BAK=1 and thus the signal BUSY again becomes zero, whereby the microprocessor resumes control of the bus (block 189).

It will be clear therefore that the daisy chain connection of the units CONT for control of the bus 21 is capable of resolving the conflict in the event of a request for the bus by a plurality of units CONT. It also propagates the enabling action for taking the bus in a serial mode, imparting the function of bus master to the various CONT in turn.

The CONT which has concluded assumes lowest priority, whereby the request for the bus becomes of distributed type. The daisy chain mode of connection may therefore be considered as open at both sides, that is to say, connected as a ring to the microprocessor.

As described hereinbefore, control for releasing the bus is given by deactivation of the respective request signal BOUT which is then returned to high level. It was first assumed that such deactivation takes place when a CONT has finished its work, that is to say, each CONT effects multiple character exchanges in a burst mode. It will be appreciated that it is also possible to provide that at least one of or all the CONT are predisposed to exchange one character at a time, whereby the signal BOUT returns to 1 at the end of the character exchange cycle, permitting more frequent arbitration of the bus. Finally, it may be provided that at least one unit CONT consents to being interrupted by a downstream unit CONT in the daisy chain. In that case, at the end of the current cycle, the bus master permits the requesting CONT to take control of the bus, suspending the connection thereof before having exhausted its work. The bus master which is thus suspended may resume control of the bus when the conditions for acquisition thereof occur. That particular feature permits co-occupation on the same bus as between units CONT which exchange characters in infrequent bursts, such as magnetic disc unit control means, with which single exchanges are effected at high frequency, like high-speed line controls.

what is claimed is:

1. A data processing system including a central processing unit, a plurality of input-output units connected to said central processing unit by means of a system bus, a program operating system for controlling said central processing unit and said input-output units, a plurality of circuits for generating corresponding vectored interrupts for said central processing unit, each one of said circuits being associated with one of said input-output units, means conditionable for generating non-vectored interrupts for causing said central processing unit to effect corresponding services, said operating system being responsive to specific operations of said input-output units for so conditioning said non-vectored interrupt generating means, and an interrupt control unit for handling said vectored interrupts by giving them different priority levels, said non-vectored interrupts being divided in a plurality of priority levels according to the kind of services to be effected, said plurality of priority levels having lower priority with respect to the priority levels of said vectored interrupts and said non-vectored interrupts, the improvement comprising means included in said central processing unit for stacking said non-vectored interrupts in a plurality of different registers according to a relative priority level assigned to said non-vectored interrupts, a store included in said interrupt control unit for simultaneously storing one non-vectored interrupt at a time fetched from each of said registers, and a priority circuit for masking each time all interrupts stored in said store except for the one having the highest level of priority.

2. A system according to claim 1, wherein each one of said vectored interrupts requires the execution by said central processing unit of a corresponding interrupt routine comprising a head, a body and a tail, said tail being the same for the routines of the same priority level, the improvement comprising means included in said central processing unit for creating a window at the end of the execution of the body of said interrupt routine, and means for causing said processing unit to execute the subsequent interrupt of the same priority level when said end of body is sensed, thus causing the execution of said other vectored interrupt of the same priority level, whereby the tails of a set of sequentially executed routines of the same priority level are skipped.

* * * * *